(12) United States Patent  (10) Patent No.: US 8,919,571 B2
Clark et al.  (45) Date of Patent: Dec. 30, 2014

(54) FILTRATION DEVICE (75) Inventors: Phillip Clark, Wakefield, MA (US);
John Doyle, Kensington, NH (US)

(73) Assignee: EMD Millipore Corporation, Billerica, MA (US)

( * ) Notice: Subject to any disclaimer, the term of this patent is extended or adjusted under 35 U.S.C. 154(b) by 1025 days.

(21) Appl. No.: 12/733,821

(22) PCT Filed: Sep. 16, 2008

(86) PCT No.: PCT/US2008/010761
§ 371 (c)(1),
(2), (4) Date: Jul. 1, 2010

(87) PCT Pub. No.: WO2009/045268
PCT Pub. Date: Apr. 9, 2009

(65) Prior Publication Data
US 2010/0307967 A1  Dec. 9, 2010

Related U.S. Application Data (60) Provisional application No. 60/997,655, filed on Oct. 4, 2007.

(51) Int. Cl.
*B01D 29/01* (2006.01)
*B01D 35/30* (2006.01)
(Continued)

(52) U.S. Cl.
CPC ........ *B01D 65/003* (2013.01); *B01D 2201/204* (2013.01); *B01D 29/01* (2013.01);
(Continued)

(58) Field of Classification Search
CPC ........... B01D 29/0004; B01D 29/0018; B01D 29/009; B01D 29/0095; B01D 35/30; B01D 35/301; B01D 35/306; B01D 2201/34; B01D 2201/342; B01D 2201/204
See application file for complete search history.

(56) References Cited

U.S. PATENT DOCUMENTS 3,085,689 A  4/1963 Hering et al.
4,614,585 A  9/1986 Mehra et al.
(Continued)

FOREIGN PATENT DOCUMENTS

EP  0059809 A1  9/1982
JP  57144013 A  9/1982
(Continued)

OTHER PUBLICATIONS

International Search Report and Written opinion received for PCT Patent Application No. PCT/US2008/010761, mailed on Jan. 29, 2009, 8 pages.

(Continued)

*Primary Examiner* — Katherine Zalasky
(74) *Attorney, Agent, or Firm* — EMD Millipore Corporation (57) ABSTRACT

The present invention provides a vacuum filter device including a filter body having two holders on opposite sides of a filter. Each holder contains a closed container in a fluid-tight, sealed relationship. The filter is retained by a compression sealing element that resiliently applies sealing pressure to the upper surface of the filter. The sealing element is maintained in place by a compression element formed of a ring that applies a desired compressive force to the sealing element. The compression element is bonded to a portion of the body to hold it, the sealing element and filter in place and under a compression seal. The invention also can provide for an alignment feature on the compression element that ensures the port is in alignment with the vent of the device. The device also includes a vacuum port communicating with the downstream side of the filter, and hence the filtrate container.

5 Claims, 9 Drawing Sheets

(51) Int. Cl.
*B01D 65/00* (2006.01)
*B01D 63/08* (2006.01)
B01D 29/50 (2006.01)
B01D 29/56 (2006.01)

(52) U.S. Cl.
CPC ....... *B01D 2201/34* (2013.01); *B01D 2201/342* (2013.01); *B01D 35/301* (2013.01); *B01D 63/087* (2013.01); *B01D 2313/04* (2013.01)
USPC ........ 210/406; 210/416.1; 210/455; 210/472; 210/474

(56) References Cited

U.S. PATENT DOCUMENTS

| 4,673,501 | A | | 6/1987 | Wells et al. | |
|---|---|---|---|---|---|
| 4,678,576 | A | | 7/1987 | Leoncavallo | |
| 5,141,639 | A | | 8/1992 | Kraus et al. | |
| 5,462,675 | A | * | 10/1995 | Hopkins et al. | 210/767 |
| 5,603,900 | A | | 2/1997 | Clark et al. | |
| 2003/0080045 | A1 | | 5/2003 | Zuk, Jr. | |

FOREIGN PATENT DOCUMENTS

| JP | 60132803 | U | 9/1985 |
|---|---|---|---|
| JP | 3249926 | A | 11/1991 |
| JP | 06507375 | A | 8/1994 |
| WO | 92/00132 | A1 | 1/1992 |

OTHER PUBLICATIONS

International Preliminary Report on Patentability received for PCT Patent Application No. PCT/US2008/010761, issued on Apr. 7, 2010, 6 pages.

* cited by examiner

FILTRATION DEVICE

CROSS REFERENCE TO RELATED APPLICATIONS

This application is the U.S. National Stage Application of International Application No. PCT/US2008/010761, filed on Sep. 16, 2008, which claims priority to U.S. Application No. 60/997,655, filed Oct. 4, 2007.

The present invention generally relates to vacuum filter devices and particularly to such devices for filtering liquids from one container through a membrane and depositing the filtrate directly into another container. More particularly, the invention relates to a liquid-tight, closed filtration system in which solutions, such as tissue culture media, are vacuum filtered.

BACKGROUND OF THE INVENTION

Devices for filtering biological solutions generally involve three primary components, i.e. a membrane filter interposed between two vessels, a feed container located upstream of the membrane for holding the sample solution to be filtered and a filtrate container located downstream of the membrane filter for collecting the filtered sample solution. Often a vacuum is drawn downstream of the membrane to increase the rate of filtration by creating a pressure differential across the filter. However, in such cases provisions must be made to maintain the pressure differential across the membrane and thus assuring that the filtration will not stop.

The arrangement of components for vacuum filtration can take various forms; however, especially in laboratory settings, ease of use, reduced storage requirements and minimal disposable hardware are important concerns as is avoiding spillage of the biological solution. In certain other applications, preserving the sterility of the solution being filtered is also important.

An example of a vacuum filter device is described in U.S. Pat. No. 4,673,501 wherein an open funnel for receiving a sample of solution to be filtered is arranged to be sealed to the top of a bottle for collecting filtrate. The base of the funnel includes a membrane filter positioned such that when the sample to be filtered is poured into the top of the funnel all of the sample solution is directed to flow through the membrane filter. A vacuum conduit which is adapted to be connected to a vacuum source is formed within the base of the funnel and allows a vacuum to be drawn within the filtrate bottle thereby drawing the sample solution through the membrane filter. Since the pressure differential across the filter is constant due to the application of a vacuum on the downstream side of the filter and atmospheric pressure present on the liquid surface of the open funnel, rapid filtration is possible and any reduction in flow rate is due to filter fouling. Nonetheless, vacuum filter devices of the type described in this patent suffer from a number of drawbacks which make them inconvenient for laboratory use. First, these devices require the liquid sample be transferred from its normal laboratory container to an open funnel which can lead to spills, sample contacting more surfaces which can introduce loses to the surface by non specific binding or addition of unwanted species from improperly cleaned or handled labware. Because of the liquid weight concentrated at the top of this assembly, they are prone to tipping and hence spilling the biological solution during pouring of sample or when connecting the vacuum hoses. Aside from the inconvenience to the user in handling the fluid to be filtered, there is an enhanced risk of compromising the sterility of the particular biological solution due to the open nature of this device. Moreover, the large size of these filter assemblies results in their taking up limited laboratory storage space. In addition, since the containers utilized in the filtration process are disposable and intended for one-time use, a significant amount of solid waste is generated by these filter assemblies and the associated pre- and post-filtration containers.

To minimize the amount of solid waste and fluid transfers, U.S. Pat. No. 5,141,639 describes a vacuum filter assembly wherein the membrane filter is disposed in a cover sealable to the filtrate container. The cover is formed with a feed port in the form of a tubular feed nipple on the upstream side of the membrane filter. A length of tubing is connected at one end to the feed nipple and the other end is directly inserted into a sample container housing the solution to be filtered. The cover also includes a filtrate outlet port and a vacuum port, both of which fluidically connect with the downstream side of the membrane filter. When tubing is attached to the vacuum port and a vacuum is drawn the sample solution to be filtered is caused to flow through the tubing and pass through the membrane filter to the filtrate container. As is the case with the aforementioned U.S. Pat. No. 4,673,501, the pressure difference in this prior art assembly remains constant because of the vacuum in the filtrate container and the atmospheric pressure acting on the liquid surface in the open feed or sample container. While this device minimizes the amount of solid waste generated during filtration, it is cumbersome to use as the operator must assemble the tubing to the cover and hold the over on the filtrate container until the necessary vacuum pressure has been achieved in the filtrate container. Additionally, the feed tubing must be maintained submerged in the sample container to avoid air being drawn into the sample solution which could disrupt the filtration. In addition, the sample is housed in an open container; therefore, the risk of compromising biological integrity or sterility is heightened.

U.S. Pat. No. 5,603,900 overcame many of these problems by providing a device with two closed holders, one for the feed and the other for the filtrate fluid with both attached to a common vacuum filtration body which had a vent upstream of the filter and a vacuum port downstream of the filter. However, it still is limited in applications as the filter is sealed, heat sealed, to the upper inner surface of the body. This limits the types of membranes or filters that can be used in the device to those which can be heat sealed to the body surface. Other filters such as filter paper, ultrafiltration membranes, glass filters, and/or multiple layered filters cannot be used in this system despite the strong need to do so.

Thus it is apparent that the need still exists for an improved vacuum filter device that can accommodate a wide variety of filters and integrally seal them in the body of the filter device.

SUMMARY OF THE INVENTION

The present invention overcomes the disadvantages and limitations of the prior art by providing a vacuum filter device for filtering solutions which includes a filter body having two junctions disposed on opposite sides of a filter. Each junction is adapted to receive a closed container in a fluid-tight, sealed relationship. The filter is retained within the body by a compression sealing element that resiliently applies a sealing pressure to the upper surface of the filter maintaining it against the filter support in the body such that all fluid entering the device must pass through the filter before entering the bottom container. The sealing element is maintained in place by a compression element formed of a ring that applies a desired compressive force to the sealing element. The compression element is captured within the body during or prior to assembly, the sealing element and filter in place and under a compression seal. Other aspects of the invention include provisions for forming a port in the ring that can be aligned with the vent of the device. The invention also can provide for an alignment feature on the compression element that ensures the port is in alignment with the vent of the device. The device also includes a vacuum port communicating with the downstream side of the filter, and hence the filtrate container. When connected to a vacuum source, the pressure differential will allow a vacuum to draw the sample solution from the sample container through the filter and into the filtrate container. To maintain the pressure differential necessary to continue the flow of sample, a passageway communicates with the upstream side of the membrane, and hence the sample container, to provide a vent to atmospheric pressure.

In accordance with a preferred embodiment of the invention, two identical laboratory containers, for example 50 ml centrifuge tubes, are screwed onto opposite sides of a filter body. Two passageways formed in the filter body communicate fluidically with the opposite sides of the membrane and ultimately with each of the containers. One of the passageways is a vacuum port which communicates with the downstream side of the filter and is adapted to be connected to a vacuum source for enabling sample to be drawn through the filter and be collected as filtrate. The other passageway communicates with the upstream side of the filter (and the sample container) and serves as a vent to atmospheric pressure.

When a sample solution is placed in the sample container and both the sample container and an empty filtrate container are secured to the filter body, a vacuum is applied to the vacuum port to create a pressure differential between the two containers. This pressure differential causes sample fluid to pass through the filter from the sample container to the filtrate container. As the volume of fluid in the sample container is reduced, air enters through the venting passageway to maintain the pressure differential across the filter so that filtration continues uninterrupted until the sample is filtered.

In certain applications, the liquid-tight feature of the above mentioned small dimension passageway is enhanced by decreasing the surface energy of the passageway. This may be achieved by either inserting a hydrophobic liner into the passageway or inserting a hydrophobic structure or applying a hydrophobic surface treatment to all or a portion of the internal surfaces of the passageway.

These and other aspects and advantages of the invention will become apparent from the following detailed description taken in conjunction with the drawings.

DETAILED DESCRIPTION OF PREFERRED EMBODIMENTS

Figure 1:
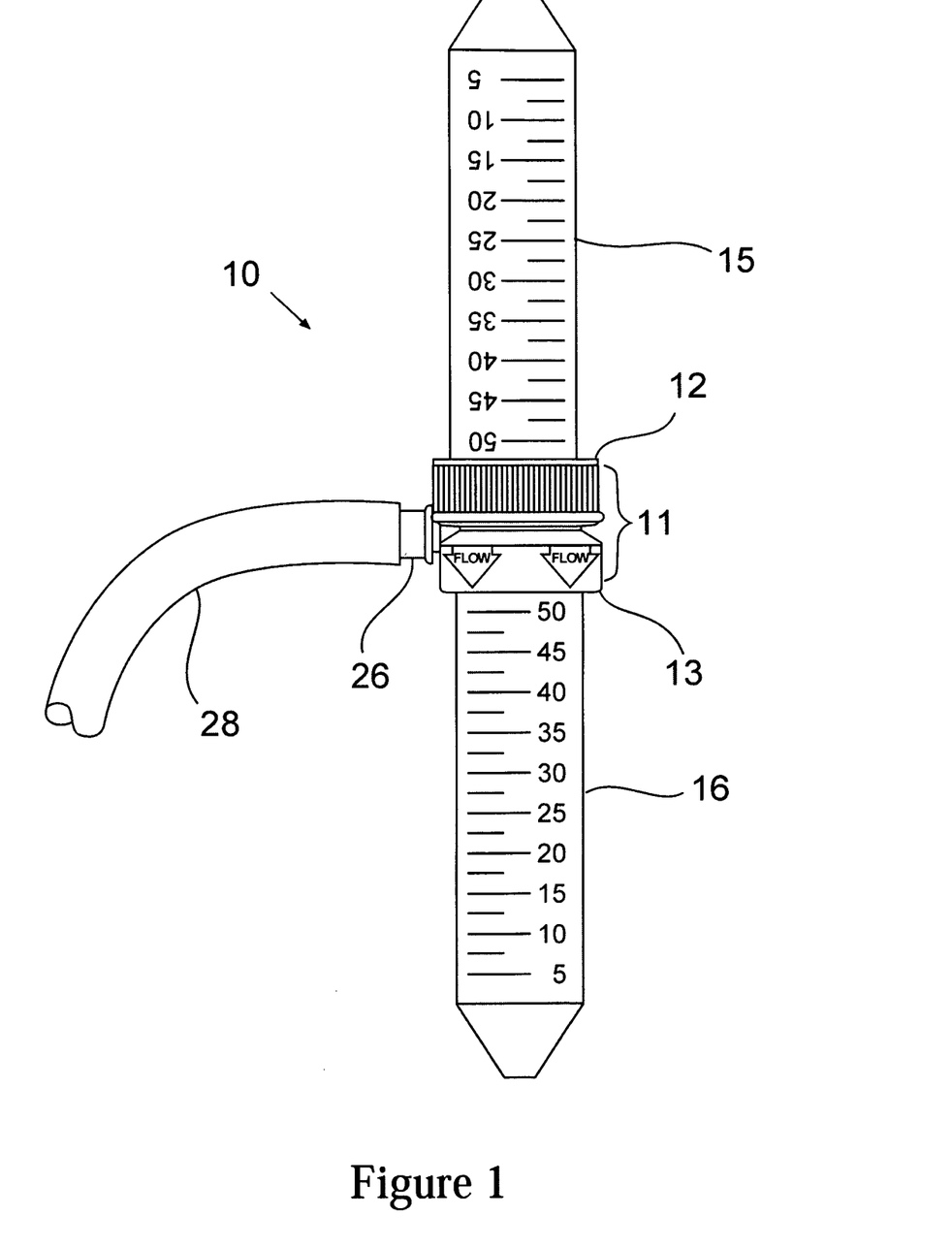
FIG. 1 shows an embodiment of the invention in planar view.

FIG. 1 shows a vacuum filter device 10 which includes a filter body 11 having a pair of axially disposed holders 12, 13 each having an open end. The open end of each of the holders 12, 13 serve as a junction to accept a closed sample container 15 for a biological fluid such as tissue culture media to be filtered and a closed filtrate container 16 for collecting the filtered sample (filtrate). The holders 12, 13 may be threaded and matched to threads (not shown) of the containers 15, 16 so they may be secured to the body 11 by the matching threaded portions of the holders 12, 13 and containers 15, 16. Other means such as bayonet locks, snap collars, clamps, such as Tri-clover® or Ladish clamps, may also be used to hold the containers 15, 16 to the holders 12, 13. The sample 15 and collection 16 containers are shown as being identical, but they can be different, such as 15 ml sample tube into a 50 ml filtrate tube. The only requirement for the containers 15 and 16 is that they couple to the holders 12 and 13 in a fluid tight fashion. The holders 12, 13 are bonded back-to-back (see FIG. 2) at interface 32 by any suitable welding technique such as ultrasonic welding to form an integral body. Other welding methods can be employed, such as, but not limited to, spin welding, adhesives, laser welding, overmolding and non-contact thermal bonding.

The holder 13 (FIG. 2) includes a face plate 17 with a series of radially extending ribs 19 molded in the plate and form the top surface of the plate 17. The ribs 19 have spaces between them through which liquid which has passed through a filter 18 may flow to the components downstream of the face plate 17. The ribs 19 act as a support for the porous filter 18 which is placed on top of the face plate 17. A compression sealing element 20 is located above the filter 18 and forms a compressive seal with the upper peripheral surface of the filter 18 such that all fluid entering the filtrate holder 16 must do so by having passed through, rather than around, the filter 18. A compression element 21 is placed within the inner bore of the upper portion of holder 13 above the sealing element 20. The element 21 has an opening 22 (FIG. 3) formed through its sidewall which aligns with a venting passageway 25, the function of which is explained in further detail below. The bottom of the holder 12 abuts the top of holder 13 at an area 32 and is bonded to the holder 13 as described above. The holder 12 includes a guard 26 formed as part of the holder 12. The guard may be wagon-wheeled shaped as shown such that when the two holders 12, 13 are bonded together sample solution can flow through a series of openings 27 and then be filtered by the filter 18. Grids and other open supportive structures can be equally used. A passageway 30 in the lower portion of holder 13 provides the fluid communication link between the downstream side of the filter 18 and the filtrate container 16.

Figure 2:
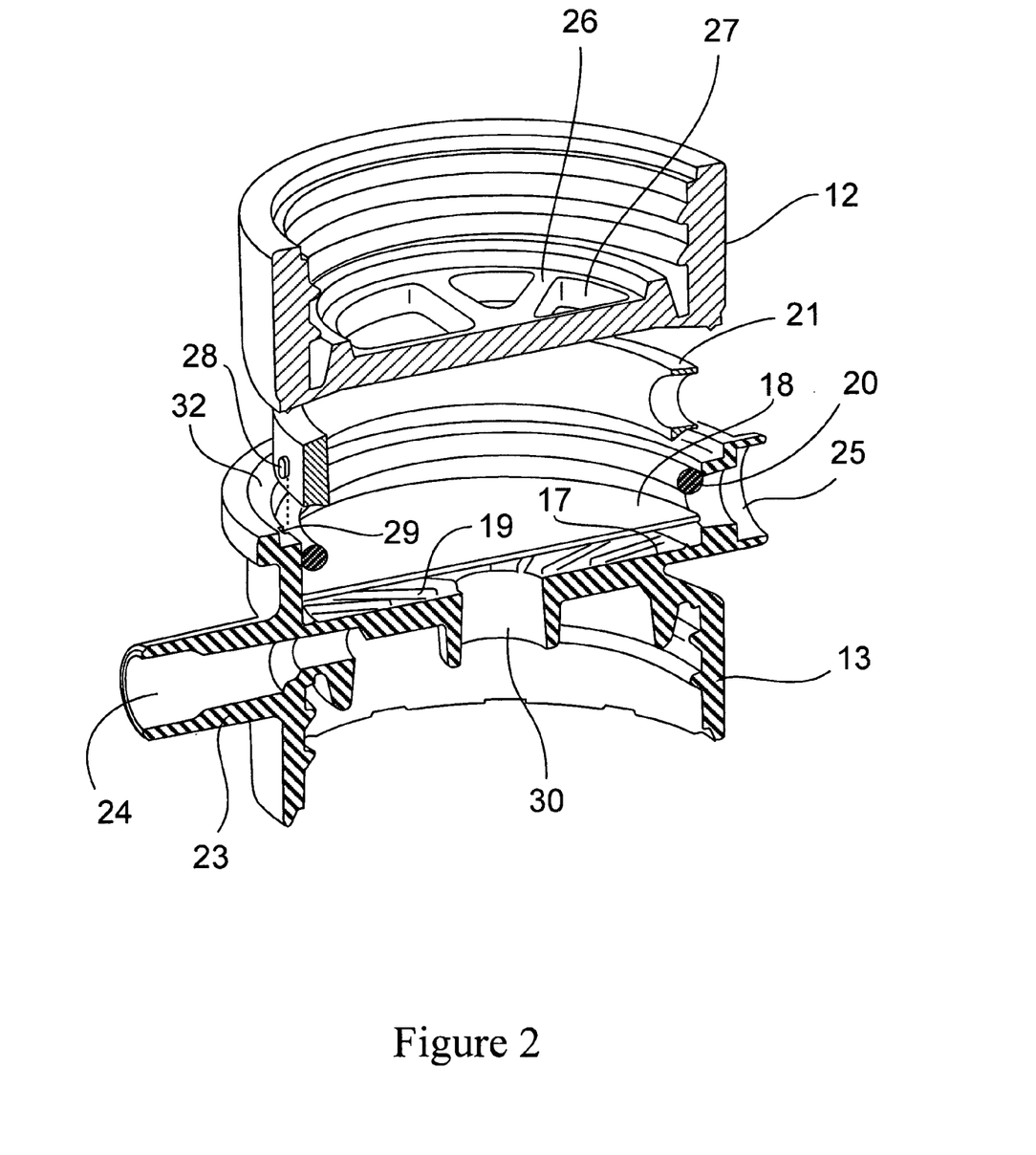
FIG. 2 shows a filter body of one embodiment of the present invention in exploded cross-sectional view.
Figure 3:
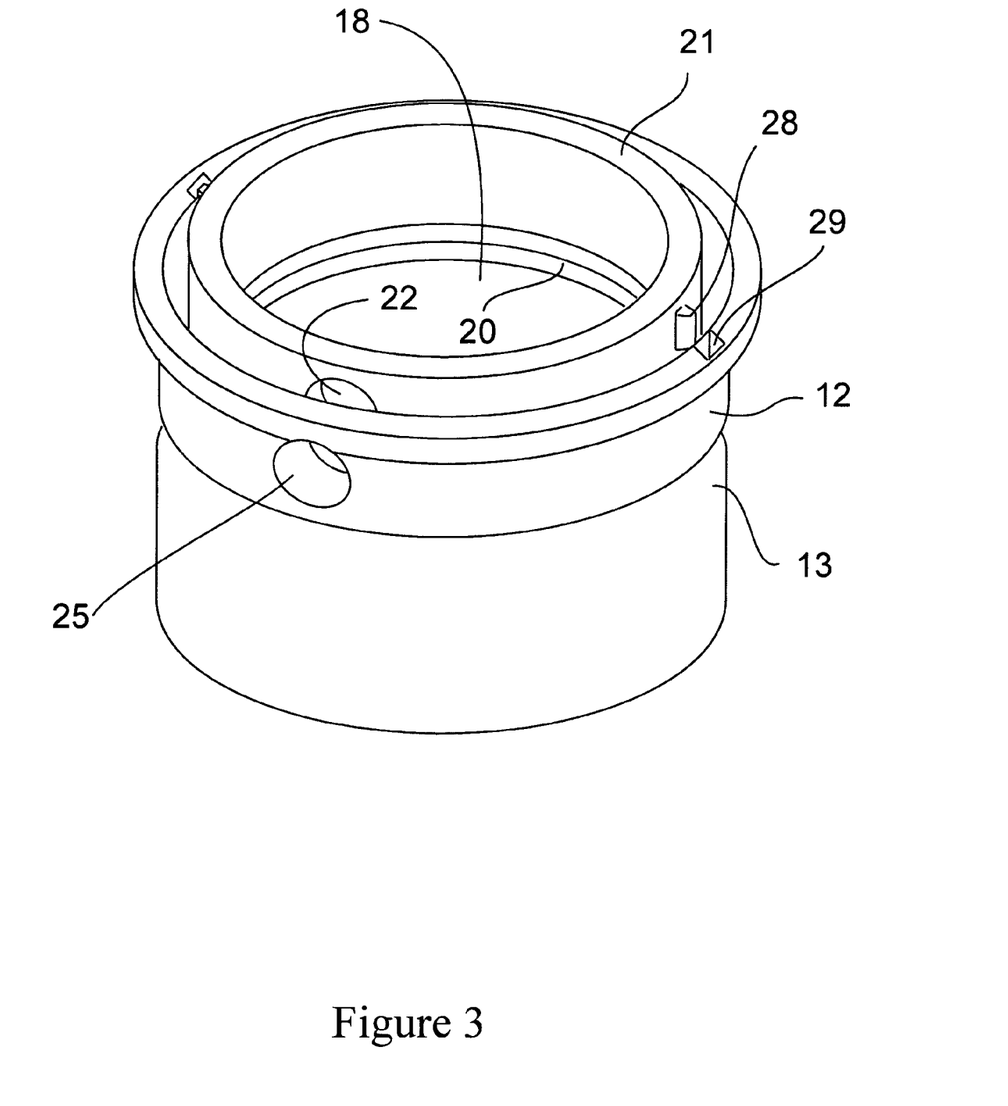
FIG. 3 shows the embodiment of the body of FIG. 2 in planar view.
Figure 4:
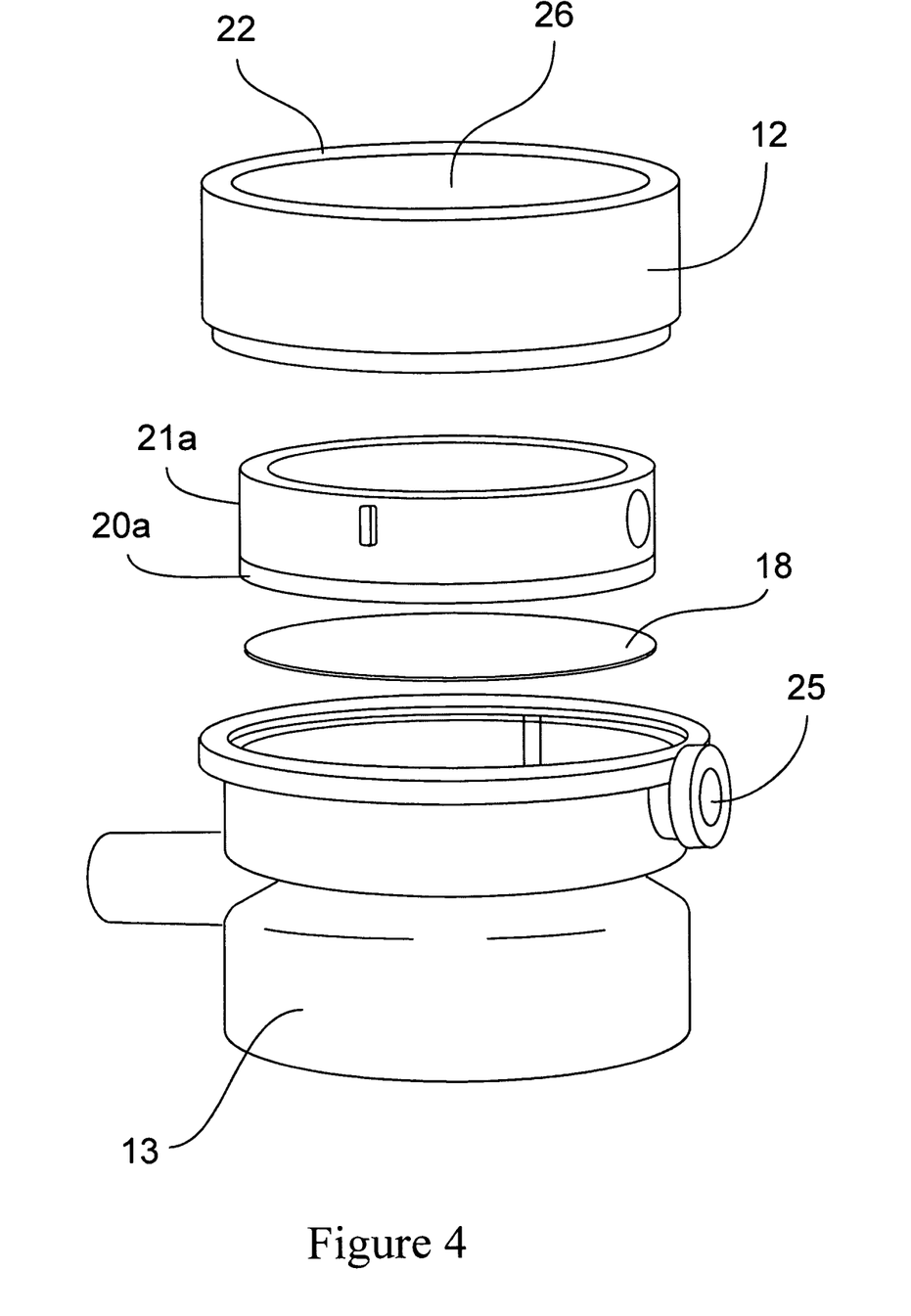
FIG. 4 shows another embodiment of the body of the present invention in exploded view.

Preferably, the device also contains an alignment feature 28 so that the opening 22 of the compression element 21 (FIG. 3) will be aligned with the venting passageway 25 during assembly. This avoids any misalignment which might occlude the passageway 25 during use. As shown, this feature 28 is in the form of a tab that extends outwardly from the outer wall surface of the compression element 21. This alignment feature, such as the tab as shown, can have a corresponding alignment piece 29 in or on the body 13 into which the element 21 is inserted so as to ensure the alignment remains during bonding and use. In the present embodiment shown in FIGS. 2 and 3, this alignment piece 29 is a slot that is designed to fit the tab 28 of the alignment feature. The alignment piece 29 can have and preferably has a set depth or other mechanism to prevent the compression element 21 from being extended too far into the body and overcompress the sealing element 20 or filter 18. A tab 28 in a slot 29 is shown in FIGS. 2 and 3, but any geometric male—female mating feature can be used as long as they provide a radial alignment of the holder and the compression element to insure proper venting during use. One or more of these devices may be used so long as they maintain proper alignment. As shown one preferably embodiment is to use two such alignment devices diametrically opposed to each other. They can be offset from each other, they may be the same or different in size, style, etc to ensure proper alignment and the like as would be well known to one of ordinary skill in the art.

A vacuum port 23 (FIG. 2) is formed in the sidewall of the holder 13 and is in fluid communication with the downstream side of the filter 18. The port 23 may include a filter matrix (not shown) within the central bore 24 of the port 23. The matrix is used to prevent the migration of contaminants such as bacteria or oil residues from entering the filtrate during vacuum operation as well as to protect the vacuum system from being contaminated by the filtered sample. The venting passageway 25 is formed in the side wall of the holder 13 above the face plate 17 and filter 18 and is in fluid communication with the upstream side of the filter 18 and provides a vent for the sample container 15.

The inclusion of the venting passageway 25 is important to the proper operation of the vacuum filter device 10 because the sample container 15 is a closed vessel and the overall filter device is of liquid-tight construction. The venting passageway allows for maintaining the necessary pressure differential across the filter 18. While a closed sample container would be able to start the filtration process, it would not provide commercially acceptable performance over the course of filtration.

To explain, the closed sample container starts the filtration process with an internal starting pressure at atmospheric pressure. As vacuum is applied to the vacuum port 23, the pressure differential ($\Delta P$) across the filter 18 is defined by $\Delta P = (P_{sample} - P_{filtrate})$ where $P_{sample}$ is the air pressure in the sample container and $P_{filtrate}$ is the air pressure in the filtrate container. Initially, $P_{sample} = P_{filtrate} = P_{atmosphere}$ however, as is fluid is drawn through the filter 18 to the filtrate container 16 the sample volume is being reduced. In a closed system, this reduction in the amount of sample in the sample container over time t1 to t2 translates to a reduction in pressure, as governed by the pressure/volume relationship ($P_{sample(t1)} V_{sample(t1)} = P_{sample(t2)} V_{sample(t2)}$) where $P_{sample}$ and $V_{sample}$ relate to the gas within the sample container. As the pressure in the sample container is reduced, the $\Delta P$ is lessened thereby slowing the flow rate. If allowed to continue $P_{sample}$ will equal $P_{filtrate}$ resulting in no flow. To insure the maximum $\Delta P$ and hence the greatest flow rate, the sample container 15 needs to be maintained as close to $P_{atmosphere}$ as possible. This goal is achieved by the venting passageway 25 connecting the sample container 15 with the outside atmospheric pressure.

The venting passageway 25 maintains its liquid-tight capabilities with an additional filter (not shown) covering or selectively blocking the venting passageway 25 to prevent solution from leaking out of the device and preventing the ingress of microbes or contaminants into the device during normal use.

The inclusion of a hydrophobic filter (not shown) positioned in the venting passageway 25 is preferred. Preferred forms of this filter include porous hollow fiber membranes, porous polymer rods, porous frit, such as POREX® frit, or microbore tubing, all constructed from or treated with a suitable hydrophobic resin. Alternatively, a separate filter such as a hydrophobic MILLEX® filter device is attached to the passageway 25 to provide fluid communication between the sample container 15 and the outside atmospheric pressure.

Figure 5A:
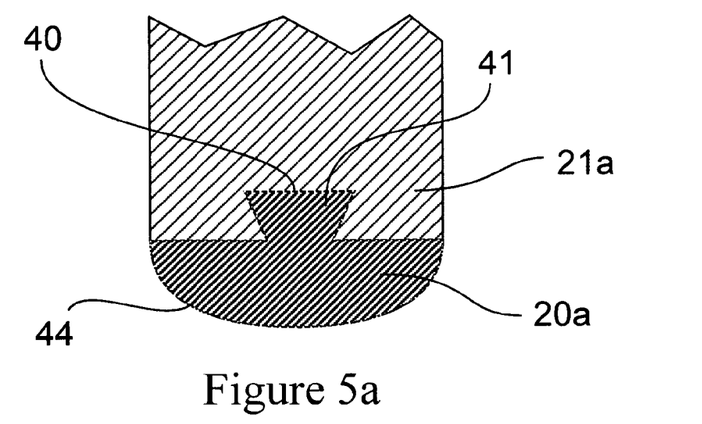
FIGS. 5A-C shows a closeup of various embodiments of the sealing element of the embodiment of FIG. 4 in cross-sectional view.
Figure 5B:
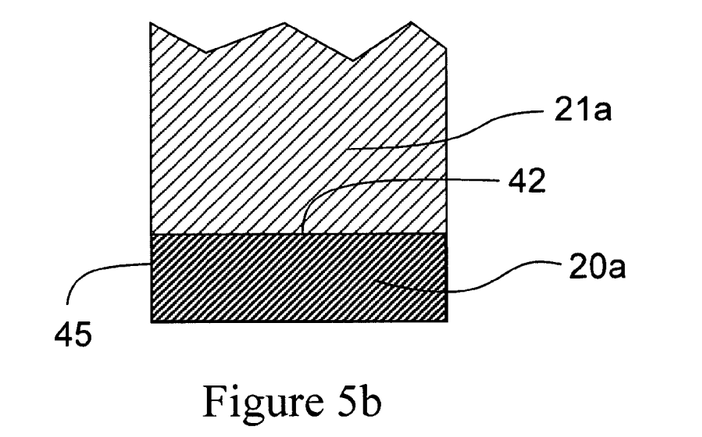
Figure 5C:
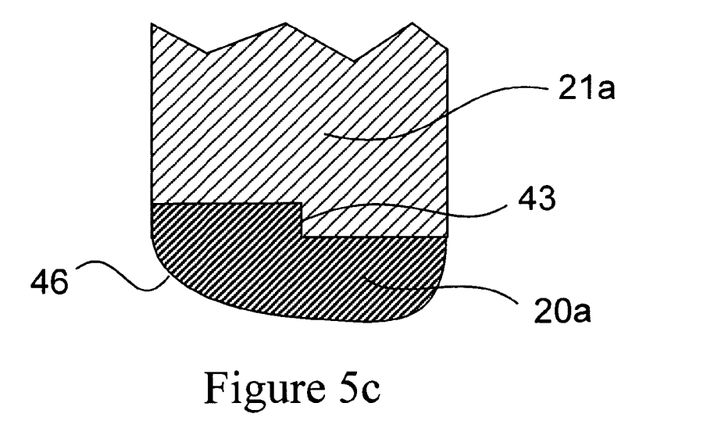

FIGS. 4 and 5a-5c show an alternative embodiment in which the sealing element 20a is bonded or otherwise formed as part of the compression element 21a. To the extent that the elements are the same in FIGS. 1-3, the same reference number will be used. Elements that have been modified will contain a letter after the reference number and new elements will be assigned a new reference number. The sealing element 20a (FIG. 5A) may be retained to the compression element 21a mechanically such as by a dovetail slot 40 formed in the bottom of the compression piece 21a into which a corresponding shaped tab 41 formed on the sealing element fits. It may also be bonded to the flat bottom surface 42 of the compression piece 21a (FIG. 5B) or to a stepped bottom 43 as shown in FIG. 5C. In either embodiment of 5B or C, the sealing element can be bonded by an adhesive such as room temperature silicones, epoxies and the like. Alternatively, it can be bonded by a heat seal. One can use solvents to form a solvent bond between the two pieces. Preferably, one can use a thermoplastic elastomer to form the sealing element 20a and mold it to the bottom surface (42 or 43) of the compression piece 21a.

The sealing element 20a of FIGS. 5a, 5b, 5c are shown with varying profiles 44, 45, 46. The profiles vary so as to change the seal force to best suit the application. In FIG. 5a the profile 44 provides a focus during compression and sealing as compared to FIG. 5b profile 45 which distributes an even compressive force across the seal area. Profile 46 of FIG. 5c has a point force biased to one side which when compressed can create a lateral pull to stretch the filter during compression.

The advantage of using an elastomeric or pliable sealing element extends beyond the ability to seal difficult to heat seal materials. It also provides a forgiving assembly process for materials that vary in thickness, are multi layers of similar and dissimiliar materials, materials that are brittle such as glass and materials or subassemblies that have 3D geometries such as columns of porous media containing bind and elute chemistries or affinity ligands such as antibodies.

Figure 6:
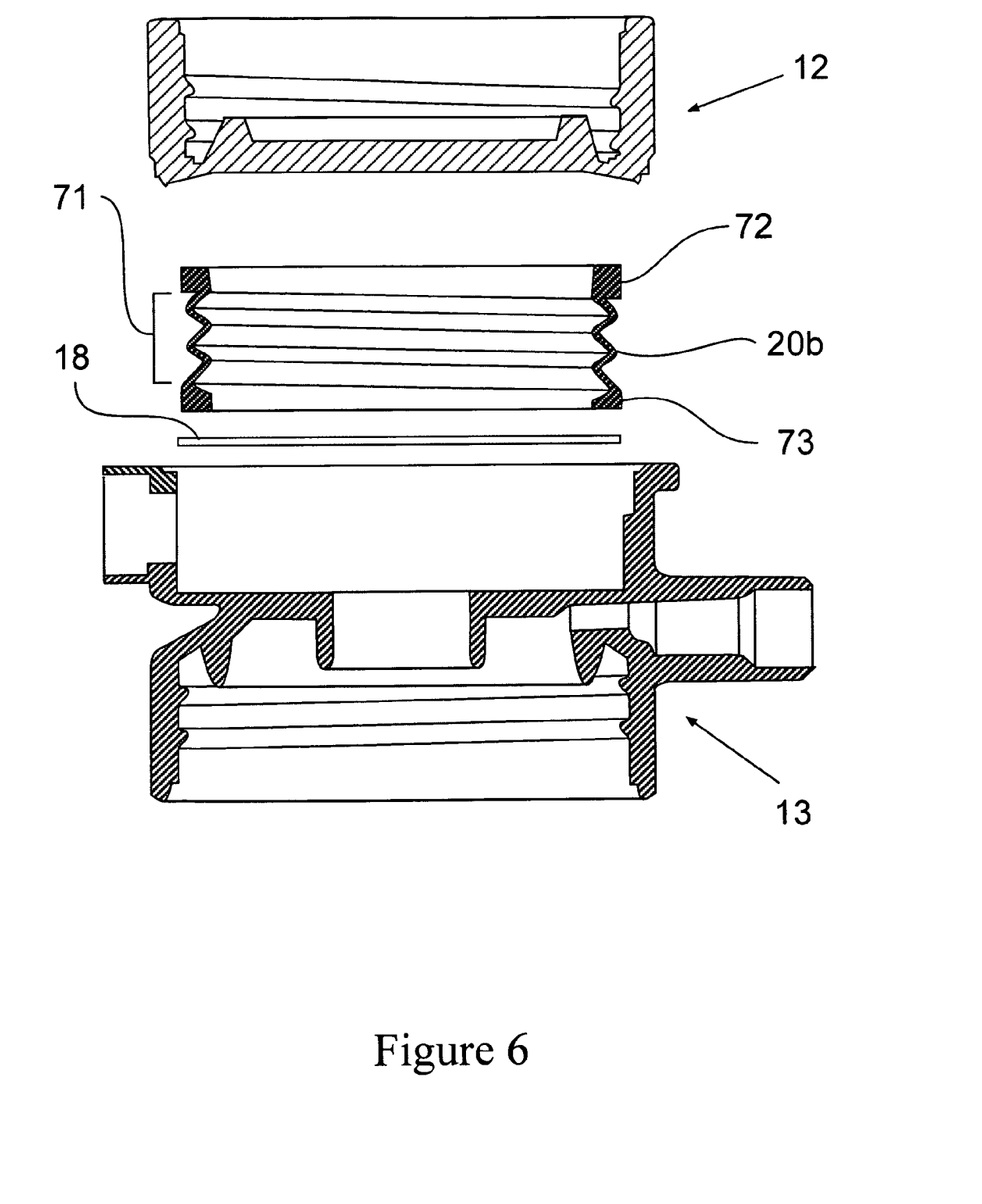
FIG. 6 shows another embodiment of the present invention in exploded view.

FIG. 6 shows still another embodiment in which the compression sealing element and the compression element have been constructed of a common component 20b. The sealing force for sealing to the top surface of the filter 18 is created by the pliable bellows section 71 of compressive component 20b. The pliable bellows 71 when assembly is compressed and the material (plastic) retains its memory thereby creating a sealing force. The pliable bellows 71 has two ends surfaces 72, 73 which are rigid and planar to mate against the holder 12 and on the upper surface of the filter 18. The end surface 72, 73 are rigid so as to distribute the sealing force uniformly across the sealing area on the filter 18.

Figure 7:
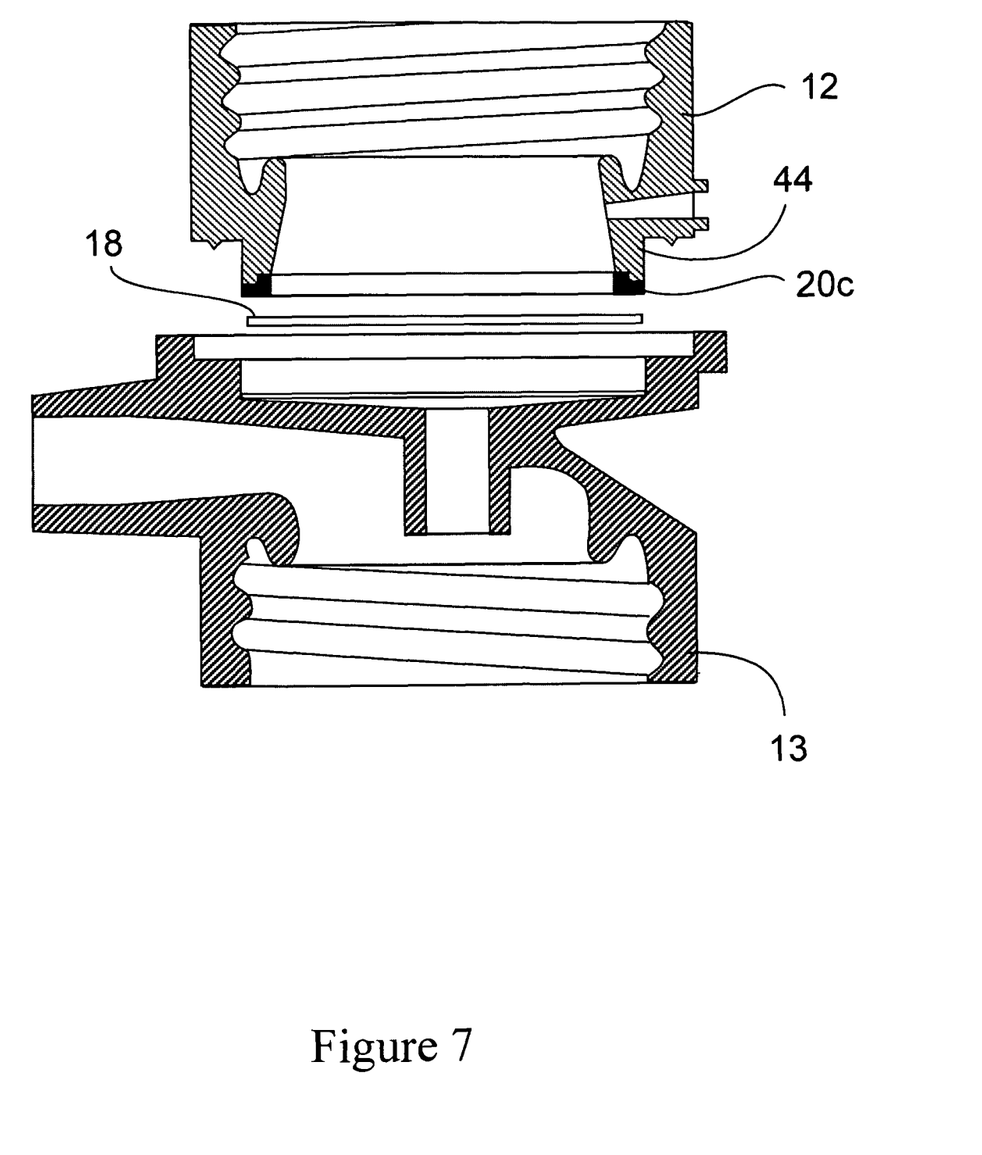
FIG. 7 shows another embodiment of the present invention in exploded view.

FIG. 7 shows still another embodiment in which the compression element 44 and the compression sealing element 20c are incorporated into the holder 12. It is further envisioned that the compressive element 20c can be fused to holder 12 as shown or it can be a separate element such as an o-ring or flat pliable gasket comprised of a silicon material or such.

Figure 8:
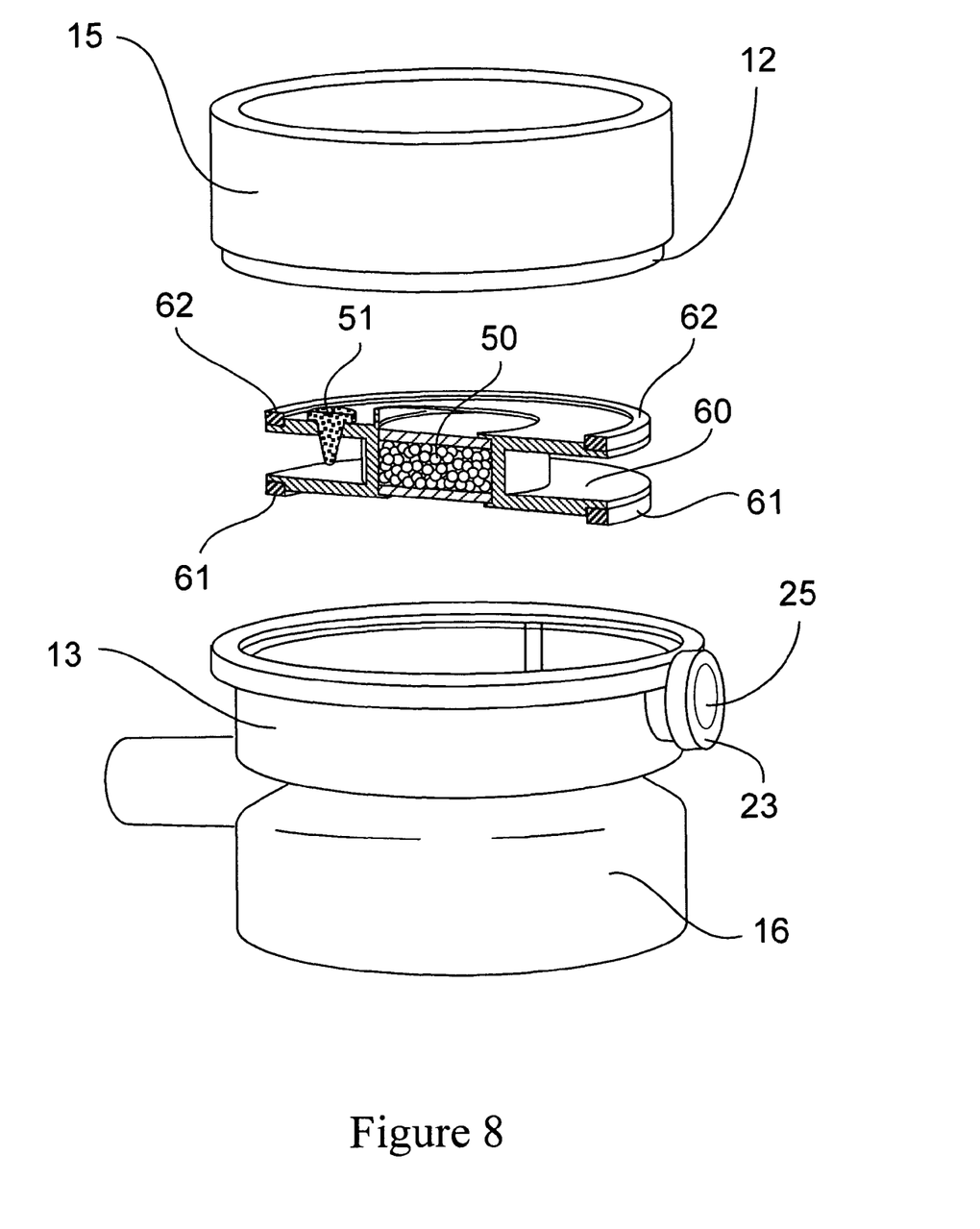
FIG. 8 shows a further embodiment of the present invention in cross-sectional view.

FIG. 8 shows still another embodiment in which in place of a filter 18 as in FIG. 2, one can have a chromatographic bed or mini column 50 contained within a flexible compressible insert 60. It may have one or more sealing elements, in this instance two, 61 and 62, which form top and bottom seals for the insert 60 between the face plate 17 and the holder 12. Also contained on the insert 60 is a vent device 51 which ensures that the atmosphere can communicate with the sample container 15. A hydrophobic filter (not shown) is contained in the passageway 25.

The chromatography media may be an ion exchange material such as an anion or cation chromatography media, a hydrophobic interaction media, or an affinity (ligand or chemical mimetic) media such as Protein A or Protein G. Such products are well known to one of ordinary skill in the art and are available from a variety of sources such as Millipore Corporation of Billerica Mass., GE Healthcare Biosciences AB of Upsala, Sweden.

Figure 9:
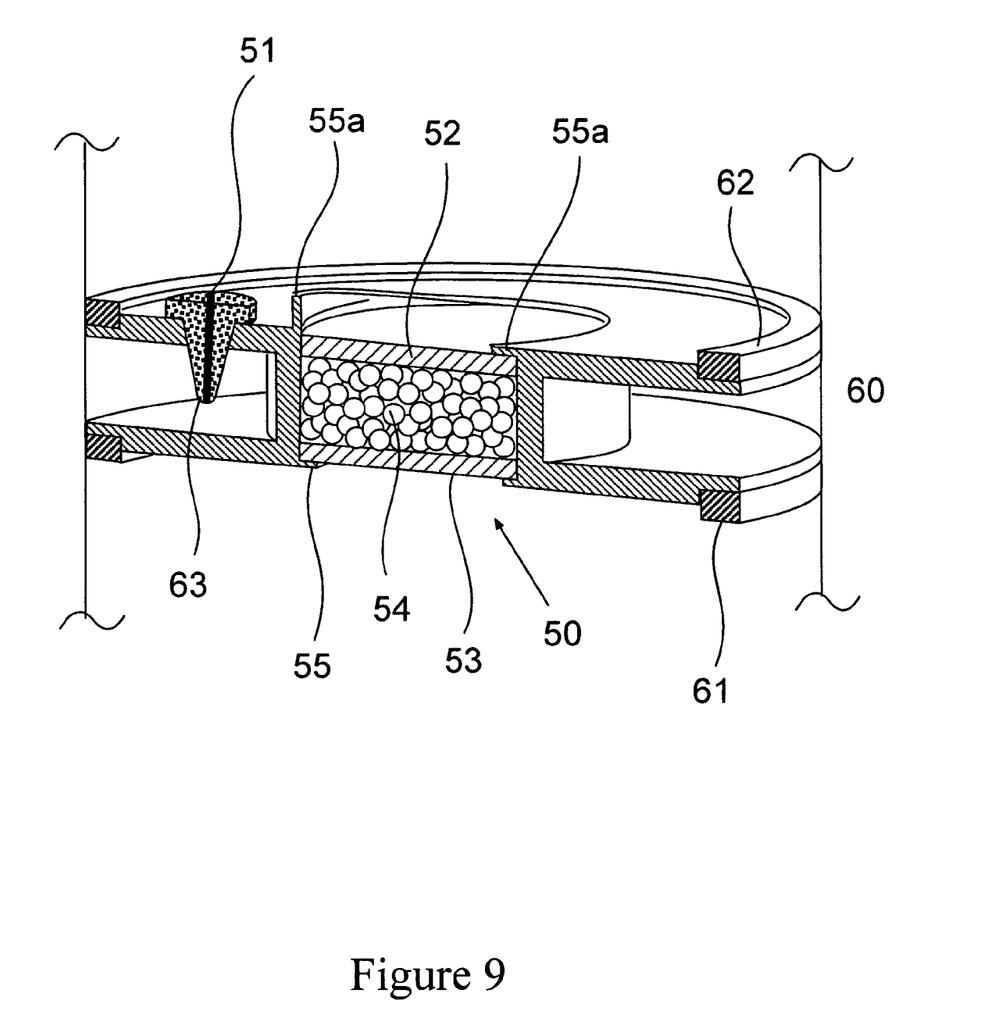
FIG. 9 shows a section of the embodiment of FIG. 8 in close up cross-sectional view.

FIG. 9 shows the bed 50 as it is retained within the base 13. The bed 50 in this instance contains a top frit 52 and a bottom frit 53 to retain the chromatography media 54 in between them. The insert 60 also has a series of inward projections or shelves or rims 55, 55a which retain the frits 52, 53 and media. They may be fixed or they may be bendable as in 55a so as to allow for the loading of the frits 52 and 53 and media 54. Alternatively, the media may be contained within a porous plastic device (not shown) which in turn is held to the insert 60 the projections 55 or 55a. The vent 51 has a passageway 63 through which air can travel.

The filter may be of any variety commonly used in filtering biological specimens including but not limited to microporous membranes, ultrafiltration membranes, nanofiltration membranes, or reverse osmosis membranes. Preferably microporous membranes, ultrafiltration membranes or nanofiltration membranes are used. Even more preferably, microporous and ultrafiltration membranes are used.

Representative suitable microporous membranes include cellulose, regenerated cellulose composites, nitrocellulose, cellulose acetate, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly(TFE-co-PFAVE), polycarbonates or particle filled membranes such as EMPORE® membranes available from 3M of Minneapolis, Minn. Such membranes are well known in the art and are commercially available from a variety of sources including Millipore Corporation of Billerica, Mass. If desired these membranes may have been treated to render them hydrophilic. Such techniques are well known and include but are not limited to grafting, crosslinking or simply polymerizing hydrophilic materials or coatings to the surfaces of the membranes.

Representative ultrafiltration or nanofiltration membranes include polysulphones, including polyethersulphone and polyarylsulphones, polyvinylidene fluoride, and cellulose. These membranes typically include a support layer that is generally formed of a highly porous structure. Typical materials for these support layers include various non-woven materials such as spun bounded polyethylene or polypropylene, or glass or microporous materials formed of the same or different polymer as the membrane itself. Such membranes are well known in the art, and are commercially available from a variety of sources such as Millipore Corporation of Billerica, Mass.

The use of inorganic materials such as glass fibers or mats, ceramic filters and the like is also possible as well as filter structures that are not microporous (e.g. depth filters), non-woven filters, etc. In some applications, a combination of filters may provide improved performance. For example, for particularly dirty samples, a depth filter which functions as a prefilter matrix in combination with a microporous filter can be used. In embodiments used to recover nucleic acids such as DNA and RNA, glass fibers or mats may be used alone or in combination with one or more prefilter layers above it and/or one or more microporous layers below it.

Suitable polymers which can be used to form the holders and the compression element include but are not limited to polycarbonates, polyesters, nylons, PTFE resins and other fluoropolymers, acrylic and methacrylic resins and copolymers, polysulphones, polyethersulphones, polyarylsulphones, polystyrenes, polyvinyl chlorides, chlorinated polyvinyl chlorides, ABS and its alloys and blends, polyolefins, preferably polyethylenes such as linear low density polyethylene, low density polyethylene, high density polyethylene, and ultrahigh molecular weight polyethylene and copolymers thereof, polypropylene and copolymers thereof and metallocene generated polyolefins.

Preferred polymers are polyolefins, in particular polyethylenes, polypropylene and their copolymers, polystyrenes, acrylic and polycarbonates.

Suitable materials to form the compressive sealing element include but are not limited any resilient or elastomeric material traditionally for sealing. These include but are not limited to a thermoplastic polymer, copolymer or terpolymer, foamed or unfoamed, such as a foamed polypropylene, thermoplastic elastomers such as Santoprene® polymers, thermosets such as urethane, especially closed cell foamed urethane, and rubber, both natural and synthetic such as silicone rubber.

A device according to the present invention as shown in FIGS. 1 and 2 is made in the following manner. A holder 13 and a holder 12 are individually molded of a thermoplastic containing all their respective elements and features as shown in the Figures including but not limited to the vacuum port 23, the vent passageway 25 the face plate 17, opening 30, guard 26 and openings 27 and alignment feature(s) 29. A compression element 21 is separately molded of a similar or identical thermoplastic as the holders 12, 13 and it contains the desired features such as the opening 22 and alignment feature(s) 28. a silicone O-ring 20 having an outer diameter substantially equal to the inner diameter of the cavity of the upper opening of the holder 13 is also obtained from a commercial source. A filter 18 such as is available from Millipore Corporation of Billerica, Mass. is obtained either in a cut disk form of a diameter substantially equal to that of the inner diameter of the cavity of the upper opening of the holder 13 or in a flat sheet form from which a disk is cut or punched. The filter 18 is placed into the upper opening of the holder 13 resting on the upper surface of the face palate 17. The compression sealing element 21 is inserted on top of and in contact with the upper surface of the filter 18 utilizing the preferred alignment features 28 and 29 to ensure that the opening 22 of the element and the vent passageway 25 align. Holder 12 is then brought into contact with the interface surface 32 of holder 13 and the two holders 12, 13 are attached to each other, preferably by one of the methods described above such as ultrasonic welding. While being brought into contact with holder 13, holder 12 also applies the desired compression to the sealing element and compression element to form a liquid tight seal about the periphery of the filter 18 such that all liquid entering opening 30 must do so by having passed through rather than around filter 18. Containers 15 and 16 are then attached to the respective holders and the device is ready for use, or optionally, it may be sterilized such as by gamma radiation before use.

In operation, a sample solution to be filtered is deposited in the sample container 15 and is attached tightly onto the holder 12 with the open end of the sample container 15 being held upward until the upper lip of the container is squeezed against the surface of the radial flange 26 Tightly attaching, such as by screwing the container 15 to the filter body 11 creates a fluid-tight seal. In similar fashion, the filtrate container 16 is attached, preferably screwed, into the holder 13 against the surface of a sealing surface 31 of the lower portion of the holder 13. Optionally, an elastomeric gasket may be positioned within the base of the holders 12, 13 adjacent the guard 26 and radial flange 31 to provide the necessary seal. For sterile filtration of tissue culture, the filtrate container and the filter body are pre-sterilized prior to coupling them together. For bind and elute procedures the specific matrix is preloaded in the holders prior to coupling to the sample container.

The device 10 is then flipped over such that the sample container 15 is oriented upward with respect to the filter body 11 as shown in FIG. 1. A length of tubing 28 is connected to a vacuum pump (not shown) and a vacuum is applied to port 23 and the filtrate container 16 is evacuated of air and the pressure therein correspondingly reduced. The unprocessed sample solution is then passed from the higher pressure sample container 15 through the membrane guard 20 and the membrane 18. The filtered solution flows through the opening 30 and collects as filtrate in the filtrate container 16. To maintain the pressure differential, which serves as a driving force, air at atmospheric pressure enters through the venting passageway 25 and replaces the volume of sample solution that passes through the membrane.

The present invention allows one to optimize the filter or filters used in the device. Unlike the prior devices which relied on heat seals to hold the filter in place, the present invention uses a compression seal that allows one to use filters that otherwise couldn't be heat sealed into the device and therefore weren't available in that device format.

Filters that are damaged to heat such as many ultrafiltration membranes or which contain materials such as humectants that inhibit bonding can now be used in this desirable filtration format. For example, the use of viral retentive filters such as Viresolve® filters available from Millipore Corporation of Billerica, Mass. can now be used in this device to allow for the recovery of viral materials. Being a closed system it provides an added safety advantage when doing so.

Additionally, the use of filters that couldn't heat bonded in place such as glass fibers or pads, or depth filters made of cellulose, spun bonded non-wovens and the like can also be easily contained within the present device. The use of multiple layered filters can be done with the present device without the limitation that each layer be capable of being heat bonded to the device surface or each other. The present invention essentially allows for the use of any filter or filter combination in the device.

Examples of such filters include but are not limited to the filter being an ultrafiltration membrane, preferably one that has a nominal weight cutoff suitable for virus retention; an ultrafiltration membrane that is either susceptible to heat bonding or contains a humectant that inhibits heat sealing, a microporous membrane having a pore size of from 0.1-10 microns whether symmetric or asymmetris in pore size distribution, a depth filter, such as one made of a non-woven such as Tyvec® material or cellulose or cellulose and filler such as diatomaceous earth, perlite and the like; a filter formed of a glass mat or fiber filter; absorbent filled membranes such as EMPORE® chromatographic membranes from 3M of Minneapolis Minn., ionically charged filters such as anionic or cationic membranes; multilayered systems of the same or different filters; two or more layers of virus retentive filters stacked on top of each there, one embodiment being a three layer system of the same membrane another embodiment being two or more layers where at least two layers have different virus retentive characteristics such as nominal molecular weight cutoff and ionic strength; a first upstream filter being a depth filter and the second downstream filter being an ultrafiltration virus retention membrane; a first upstream filter being a glass fiber or mat filter and the second downstream filter being a microporous membrane; a first upstream filter being a depth filter and the second downstream filter being a microporous membrane; a series of filters having decreasing pore sizes downstream such as a first upstream depth filter, followed by a second microporous filter having a pore size from about 1 to about 10 microns and a third downstream layer formed of a microporous membrane having a pore size of from about 0.2 to about 1.0 micron; a series of filters arranged to have an increase in pore size downstream such as microporous membrane followed by a glass filter, a porous metal filter or a non-woven filter.

Moreover, the invention simplifies construction of the device and its manufacture leading to reduced costs and time needed to make them.

What is claimed:

1. A vacuum filter device comprising;
    a. a filter body having a lower and a top holder disposed from one another, each of the holders adapted to receive respective first and second fluid containers, each container having an open end and a closed end, the open end of the first container being attached to the top holder and the second container being attached to the skirt of the lower holder, each of the open ends being attached to the respective holder in a liquid and air tight manner;
    b. each of the holders including a container sealing element for creating a liquid and air tight seal when said containers are coupled to said filter body, each of said containers forming liquid tight receptacles when coupled to said filter body;
    c. the lower holder is hollow, the lower holder having a sidewall with an inner surface, upper and lower axially spaced ends, the upper end being open, the lower end comprising a bottom wall and a skirt extending downwardly beyond the bottom wall, the bottom wall having an upper inner surface and a lower outer surface and a fluid flow port located in the bottom wall from the inner surface of the bottom wall to the outer surface of the bottom wall, the lower holder containing a filter, a sealing element and a compression element, the filter being compressively sealed with the upper inner surface of the bottom wall of the lower holder by the sealing element which is in contact with an upper surface of the filter and the compression element which has a bottom surface in contact with an upper surface of the sealing element, the compression element having a top surface, a bottom surface and a sidewall between the top surface and the bottom surface, the compression element having a diameter substantially equal to that of a diameter of the inner surface of the sidewall of the lower holder, the top holder being mounted over the compressive element within the lower holder and bonded to the inner surface of the sidewall of the lower holder so as keep the compressive element in contact with the sealing element and the sealing element in contact with the filter such that all fluid entering the container below the lower holder must do so by having passed through, rather than around, the filter, the top holder having an open top and at least a partially open bottom;
    d. a vacuum port extending through the filter body and being in fluid communication with the second fluid container at a downstream side of the filter, the vacuum port adapted to be connected to a vacuum source for drawing the liquid from the first fluid container through the filter and into the second fluid container; and e. a vent passageway in the filter body configured to permit gas in the atmosphere surrounding the vacuum filter device to be in direct fluid communication with the first fluid container on an upstream side of the filter and not to be in direct fluid communication with the second fluid container.

2. The device of claim 1 wherein the top holder has an open top and at least a partially open bottom and the vacuum port being formed in the skirt above the open end of the lower holder and extending through the sidewall of the lower holder.

3. The device of claim 1 wherein the sealing element is in the form of an O-ring.

4. The device of claim 1 wherein the compression element has an opening in its sidewall to provide fluid communication between an interior of the lower holder above the filter and the vent passage.

5. The device of claim 1 wherein the compression element has an opening in its sidewall to provide fluid communication between an interior of the lower holder above the filter and the vent passage and one or more alignment features on an outer surface of the compression element and one or more mating alignment features equal in number to that of the alignment feature(s) on the compression element formed on or in the inner wall of the lower holder so as to align the opening with the vent passage.

* * * * *